(12) United States Patent
Volker

(10) Patent No.: US 8,991,874 B2
(45) Date of Patent: Mar. 31, 2015

(54) COUPLING UNIT

(71) Applicant: Manfred Volker, Blankenbach (DE)

(72) Inventor: Manfred Volker, Blankenbach (DE)

(*) Notice: Subject to any disclaimer, the term of this patent is extended or adjusted under 35 U.S.C. 154(b) by 0 days.

(21) Appl. No.: 13/864,532

(22) Filed: Apr. 17, 2013

(65) Prior Publication Data

US 2014/0225365 A1   Aug. 14, 2014

(30) Foreign Application Priority Data

Feb. 9, 2013  (EP) ..................................... 13000696

(51) Int. Cl.
F16L 37/23 (2006.01)
F16L 37/244 (2006.01)
F16L 37/084 (2006.01)
F16L 37/34 (2006.01)

(52) U.S. Cl.
CPC ............. *F16L 37/244* (2013.01); *F16L 37/084* (2013.01); *F16L 37/23* (2013.01); *F16L 37/34* (2013.01)
USPC .......................................................... 285/277

(58) Field of Classification Search
USPC ......... 285/374, 399, 400, 391, 276, 322, 316, 285/277; 137/614.01, 614.03, 614.04, 137/614.05
See application file for complete search history.

(56) References Cited

U.S. PATENT DOCUMENTS

| | | | | |
|---|---|---|---|---|
| 115,917 A * | 6/1871 | Wharton | ........................ | 285/276 |
| 1,297,719 A * | 3/1919 | Myers | ............................ | 285/322 |
| 1,383,209 A * | 6/1921 | Iftiger | ........................... | 285/322 |
| 1,470,209 A * | 10/1923 | White | ............................ | 285/391 |
| 2,099,335 A * | 11/1937 | Hansen | .......................... | 285/276 |
| 3,394,950 A * | 7/1968 | Jensen | ........................... | 285/322 |
| 3,460,801 A * | 8/1969 | Norton | ..................... | 137/614.04 |
| 3,497,243 A * | 2/1970 | Gruller et al. | ................. | 285/322 |
| 3,550,624 A * | 12/1970 | Johnson | ..................... | 137/614.05 |
| 4,045,055 A * | 8/1977 | Blakely | ......................... | 285/322 |
| 4,106,523 A * | 8/1978 | Thornton et al. | ........ | 137/614.04 |
| 4,265,470 A * | 5/1981 | Danner | .......................... | 285/322 |
| 4,328,979 A * | 5/1982 | Stoll | .............................. | 285/322 |
| 4,763,683 A * | 8/1988 | Carmack | ................... | 137/614.04 |
| 5,144,979 A * | 9/1992 | Shobuzako et al. | ...... | 137/614.04 |
| 5,240,289 A * | 8/1993 | Gottling et al. | ............... | 285/322 |
| 5,649,723 A * | 7/1997 | Larsson | ......................... | 285/322 |
| 5,773,758 A * | 6/1998 | Coutureau et al. | ............ | 285/322 |
| 5,938,212 A * | 8/1999 | Wadsworth | .................... | 285/322 |
| 6,179,001 B1 * | 1/2001 | Schutz | ..................... | 137/614.03 |
| 7,568,737 B2 * | 8/2009 | Wells et al. | ..................... | 285/391 |
| 7,857,361 B1 * | 12/2010 | Hanser et al. | ................. | 285/322 |
| 8,267,431 B2 * | 9/2012 | Okuno et al. | ................. | 285/322 |

* cited by examiner

*Primary Examiner* — David E Bochna

(74) *Attorney, Agent, or Firm* — Hammer & Associates, P.C.

(57) ABSTRACT

The coupling element is characterized by the locking pieces, on the coupling element and on the nipple element, with circumferentially extending projections which viewed in cross-section are substantially serrated (or roof-shaped) and which extend around a part of the whole circumference of the locking pieces. The coupling element and the nipple element are elastically deformed during the inserting operation and lock in place one after the other. At least one circumferential section of the locking pieces, of the coupling element and of the nipple element, is free of serrated (or roof-shaped) projections and has guides for the twist-proof inserting operation.

6 Claims, 1 Drawing Sheet

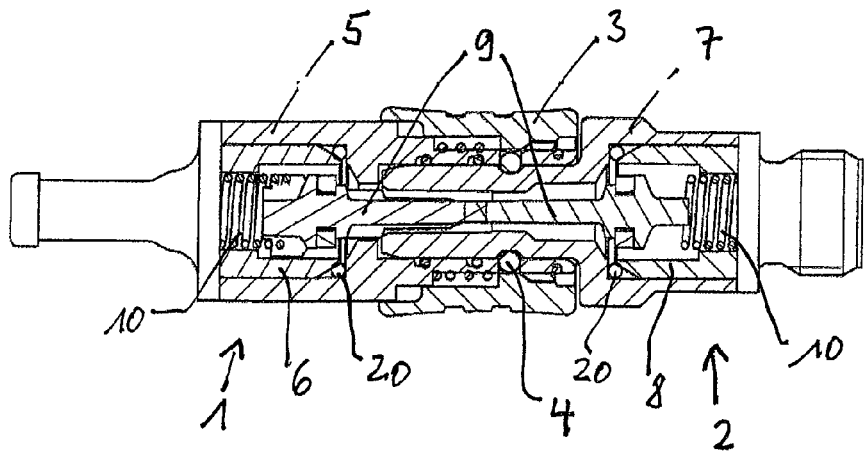
Fig 1
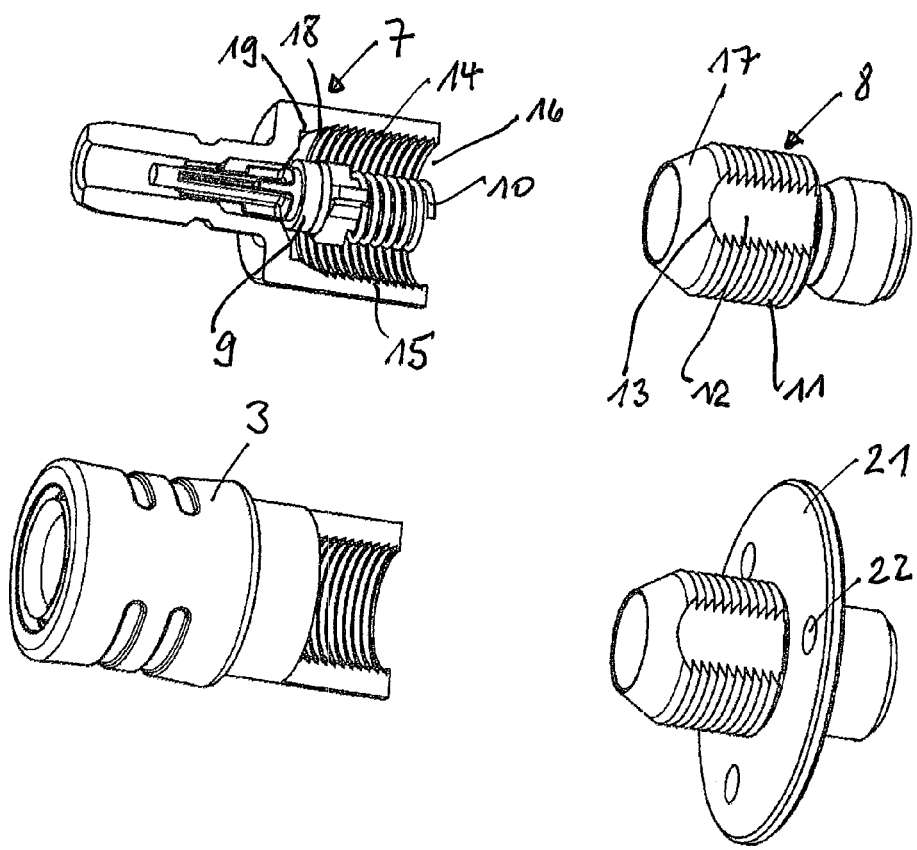
Fig 2
Fig 3

COUPLING UNIT

The present invention relates to a coupling unit of an arrangement for branching off a liquid from a pipe or a stationary unit or for supplying or removing a liquid from a flexible hose connection into a pipe or into a stationary unit. The coupling unit consists of a nipple part and a coupling part, wherein one of said parts is fastened with a section in a pipe or in a stationary unit, and wherein a respective valve body, which is spring-biased into the closed position, is displaceably held in the nipple part and the coupling part. The nipple part is composed of a nipple element and an inserted locking piece and the coupling part of a coupling element and an inserted further locking piece, with the associated parts being locked into one another, so that the axial cohesion thereof is fixed. A respective O-sealing ring is arranged between the inserted locking pieces and the nipple element and the coupling element, respectively, to ensure the tightness of the coupling unit. The locking pieces, the nipple element and the coupling element consist of a plastic material, such as PP, PVDF or comparable polymers or also glass fiber-reinforced polymers and are preferably produced in an injection molding process.

Such a coupling unit is disclosed in European patent EP 2 334 968 B1. In this coupling unit, at least one annular radial projection is respectively formed on each locking piece, the nipple element and the coupling element, and an annular groove on the other associated part, which in the completely inserted state of the parts lock into one another. Although a reliable axial cohesion of the two parts of the nipple part and the coupling part is thereby created, the locking pieces in the nipple element and in the coupling element in the inserted state may twist relative to one another upon exertion of a force, so that no precise O-seal pressing is ensured.

It is the object of the present invention to indicate a coupling unit of the type under consideration, wherein a reliable sealing in the nipple part and the coupling part is achieved together with an anti-twist protection.

This object is achieved according to the invention by the features of patent claim 1.

Advantageous developments of the invention are characterized in the sub-claims.

According to the invention the outer circumference of the locking pieces and the inner circumference of the coupling element and of the nipple element have formed thereon circumferentially extending, preferably lamellar projections which viewed in cross-section are preferably roof-shaped or serrated and the tips of which may also be rounded, and which extend around a part of the whole circumference of the locking pieces and of the interior of the coupling element and the nipple element, which accommodates said pieces, wherein the projections are partly overlapping in cross section and are elastically deformed during the inserting operation and lock in place one after the other in a substantially form-fit manner. The projections of a part, preferably of the locking piece, may here also be elastically deformed and lock into grooves of the other part.

At least one circumferential section of the locking pieces, of the coupling element and of the nipple element is free of the lamellar roof-shaped or serrated projections or grooves and, instead of this, is provided with guide means for a twist-proof inserting operation. The dimensions of the projections and the plastic material used are selected such that the inserting operation can be smoothly carried out and that thereafter a reliable axial cohesion is guaranteed, which can only be undone by applying a considerable force. The cross-sectional shape of the circumferentially extending projections or grooves is not restricted to a roof shape or serrated shape, but any expedient shape, e.g. the shape of latching noses, may be provided.

As guide means, at least one flat surface on the part to be inserted and at least one fitting mating surface on the other part are provided, said guide means ensuring anti-twist protection during the inserting operation and in the assembled state in that the at least one surface is opposite on both sides (expediently with a small play) to the projections.

It is within the scope of the invention that two or more guide means can be respectively formed, wherein preferably two flat surfaces should then be formed in diametrically opposite fashion, which is of course also true for the associated webs of the other part.

With great advantage it is further suggested that the free end section of the locking pieces should be given a smooth design without any projections and should narrow conically forwards, and that the associated accommodating chamber of the coupling element and of the nipple element should comprise a slightly shorter conical mating surface and an adjoining enlarged, preferably cylindrical contour for accommodating the O-sealing ring. The O-ring seat has here a smaller outer diameter than the smallest diameter of the latching projections. A precise O-ring seat can thereby be produced with simple means by injection molding.

Owing to the latching projections and the at least one flat surface, the locking pieces are very accurately positioned in the coupling element and the nipple element during the inserting operation, resulting in a uniform, extremely precise O-ring pressing that creates a perfect sealing in the nipple part and the coupling part.

Further details of the invention become apparent from the following description and from the drawings, in which:

FIG. 1 shows an embodiment of the coupling unit according to the invention;

FIG. 2 is a perspective inner view of a cut-away coupling element with valve body arranged therein, and a perspective view of the associated locking piece;

FIG. 3 shows the coupling element of FIG. 2 with mounted sliding sleeve and a locking piece similar to FIG. 2, but with a fastening collar.

FIG. 1 shows a nipple part 1 and a coupling part 2 which are assembled to form a coupling unit. The connection between the two parts is maintained by a sliding sleeve 3 which holds latching balls 4 in their latching position. Such a way of locking a nipple part with a coupling part is e.g. known from European patent EP 2 334 968 B1.

The receiving holes of the holding balls on the coupling part 1 are oval for injection-molding reasons. The receiving holes for the latching or holding balls can thereby be formed with simple tools during the injection molding process.

To prevent the holding balls from falling out, the sliding sleeve is provided with interior guide webs and an anti-twist protection.

The nipple part 1 includes a nipple element 5 into which a locking piece 6 is inserted, and the coupling part 2 includes, by analogy, a coupling element 7 into which a further locking piece 8 is inserted. A valve body 9 which is biased by a helical spring 10 into the closed position is respectively provided in the nipple part 1 and in the coupling part 2. In the illustrated assembled state of the coupling unit, the two valve bodies 9 are pressed back against the force of the springs 10 into the open position.

As shown in FIG. 2, lamellar, circumferentially extending projections 11 are formed on the outer circumference of the locking piece 8, wherein, however, an axial portion 12 is free of projections 11. In the illustrated embodiment, said axial portion 12 has a flat surface 13 which is engaged during insertion of the locking piece 8 into the coupling element 7 by a flat surface (not shown) of the coupling element with a corresponding cross-sectional shape and width. The flat surface 13 and the precisely fitting flat surface which is formed on the mating surface provide means for the smooth anti-twist guiding of the locking piece 8 during insertion into the coupling element 7.

In this connection it should be mentioned that also other cooperating guide means may be formed on the locking piece 8 and on the coupling element 7; these can ensure anti-twist protection.

In the illustrated embodiment the lamellar projections 11 have a serrated cross-sectional shape, just like the associated grooves 14 or the projections 15 defining the grooves on the inside of the receiving chamber 16 of the coupling element 7.

On its free end portion the locking piece 8 has a conically tapering smooth circumferential surface 17 which is free of lamellar projections. The receiving chamber 16 of the coupling element 7 has a correspondingly conical inner surface 18 which is slightly shorter than the conical surface 17 and which is followed by a substantially cylindrical inner contour 19 in which an O-sealing ring 20 (FIG. 1) is compressed when the locking piece 8 is inserted into the coupling element 7 up into the end position. The O-sealing ring 20 is thereby uniformly pressed over its whole circumference by the conical surface 17 of the locking piece 8, resulting in a perfect sealing in this instance.

The lamellar projections of the locking piece 8 and the accompanying latching elements of the coupling element 7 need not extend over the whole cylindrical section, as shown in FIG. 2, but the latching projections may also be formed just over a shorter section. The latching operation together with a twist-proof guidance is carried out in the same way as in the nipple part composed of a nipple element and an associated locking piece, so that the description thereof can be omitted here.

The locking piece 8 of FIG. 3 is provided with a fastening collar 21 which comprises holes 22 for fastening screws which may pass through said holes and with which the coupling unit can be fixed to a suitable mounting.

The invention claimed is:

1. A coupling unit for branching off a liquid from a pipe or a stationary unit or for supplying or removing a liquid from a flexible hose connection into the pipe or into the stationary unit, or into a further flexible hose connection, a part of the coupling unit being fastened with a section in the pipe or in the stationary unit, comprising a nipple part, a coupling part, the nipple part and coupling part each including a valve body, which is spring-biased into a closed position, and being displaceably held in the nipple part and the coupling part, respectively, the nipple part being composed of a nipple element and of a first inserted locking piece and the coupling part being composed of a coupling element and a second inserted locking piece, a respective O-sealing ring being arranged between the inserted locking pieces and the nipple element and the coupling element, respectively, circumferentially extending projections formed on the coupling element, nipple element and locking pieces, which when viewed in cross-section are substantially serrated, the projections on the locking pieces engage with the projections on the coupling element and the nipple element when inserted therein, thereby locking the coupling element and the nipple element to their respective locking pieces, and at least one circumferential section of the locking pieces are free of the serrated projections and create a guide means for a twist-proof inserting operation.

2. The coupling unit according to claim 1 wherein the guide means further comprise at least one axial groove and at least one web fitting into the groove, which has substantially the same width.

3. The coupling unit according to claim 2 wherein two guide means are respectively formed.

4. The coupling unit according to claim 1 wherein a free end section of the locking pieces is without projections and narrows conically forwards, and an associated interior of the coupling element and of the nipple element comprises a shorter conical mating surface and an adjoining enlarged contour for accommodating the O-sealing ring.

5. The coupling unit according to claim 4 wherein said adjoining enlarged contour is cylindrical.

6. The coupling unit according to claim 1 wherein the O-sealing ring has a smaller outer diameter than the projections.

* * * * *